UNITED STATES PATENT OFFICE.

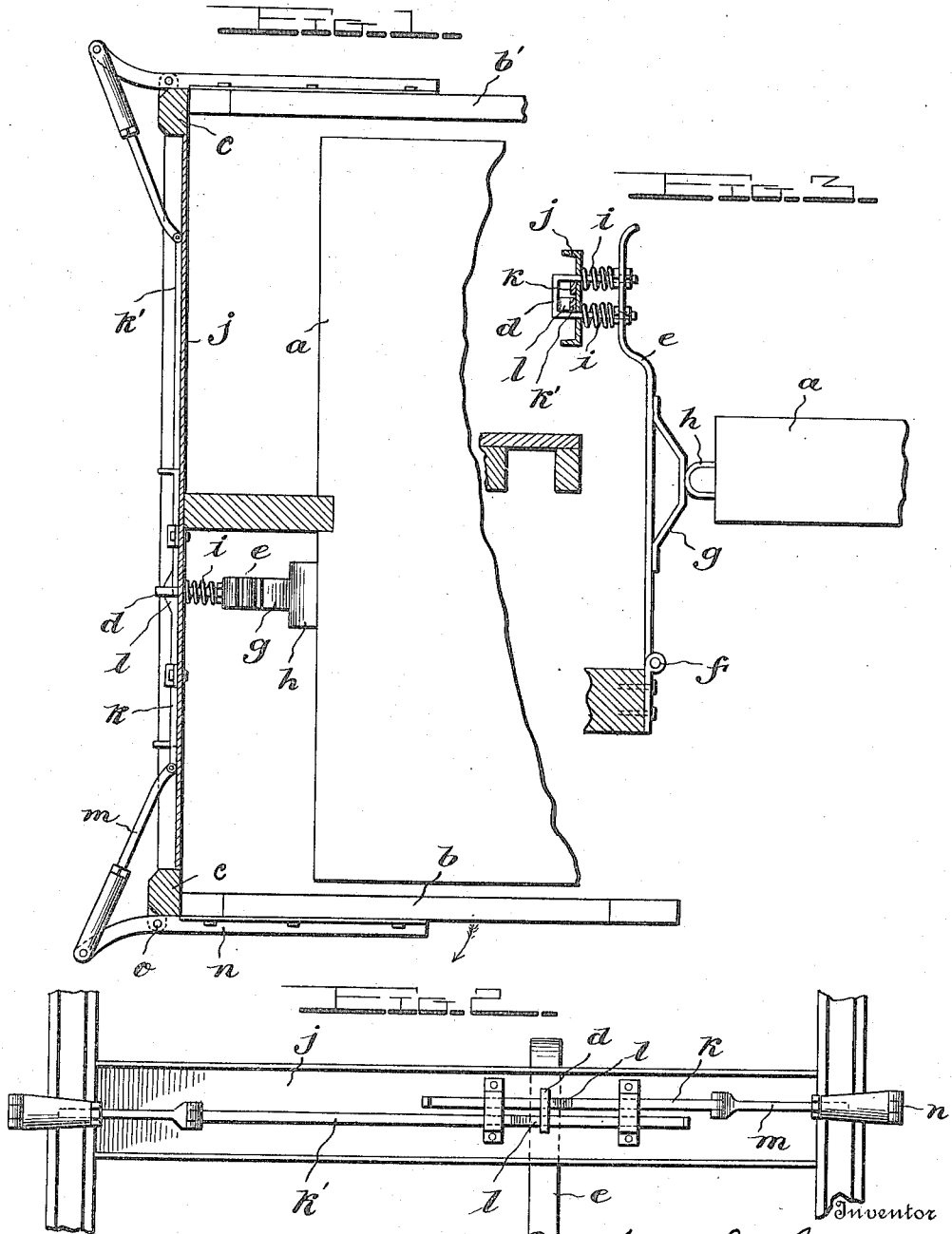

WILLIAM G. JOHNSON, OF OLD FORGE BOROUGH, PENNSYLVANIA.

SAFETY ELEVATOR-GATE.

1,143,766.  Specification of Letters Patent.  Patented June 22, 1915.

Application filed June 1, 1914. Serial No. 842,063.

*To all whom it may concern:*

Be it known that I, WILLIAM G. JOHNSON, a citizen of the United States of America, and a resident of the borough of Old Forge, county of Lackawanna, State of Pennsylvania, have invented certain new and useful Improvements in Safety Elevator-Gates, of which the following is a full and clear specification, reference being had to the accompanying drawings, in which—

Figure 1 is a horizontal section through a part of an elevator shaft showing my invention applied thereto; Fig. 2 is a side elevation of the locking devices; and Fig. 3 is a detail vertical sectional view of the locking devices.

The object of this invention is to provide simple means whereby the swinging door of mine shafts and other elevators will be positively locked against opening at all times except when the cage or car is at the landing, thereby greatly increasing the safety of mine shafts and elevators, as more fully hereinafter set forth.

In the drawings, $a$ designates a part of the cage or car; $b$, a gate adapted to swing in the direction indicated by the arrow; and $c$, the corner posts of the shaft or well.

Extending through a beam $j$ is a U-bolt $d$ whose inner ends are connected by suitable nuts to the upper end of a bar $e$ which depends into the shaft to a point below the floor line and is pivoted to the inner face of the shaft-wall at $f$. Affixed to the inner face of this bar $e$ is a cam-member $g$ which projects inwardly into the shaft sufficiently to be struck by a projection $h$, carried by the cage, when the floor of the cage reaches the same level as the floor of the landing. When said projection $h$ strikes against the cam $g$, the bar $e$ is forced toward the wall of the shaft and causes the U-bolt to move outwardly. The U-bolt and its connected bar $e$ are normally pressed inwardly by coil springs $i$ which surround the legs of the U-bolt between the bar $e$ and the beam $j$ which is affixed to the posts $c$.

The outer or arched end of the U-bolt projects outwardly beyond the plate or bar $j$, and extending through the eye formed by this projecting end of the U-bolt is the end of a bolt bar $k$, slidably mounted on the outer face of the bar $j$ and provided with a stop shoulder $l$. One end of the bolt $k$ is connected by an extensible link $m$ to the end of a lever $n$ pivoted at $o$ and connected to the gate $b$ in such manner that when the gate is swung open the link $m$ will slide bolt $k$ along the face of the bar $j$ and through the U-bolt $d$. The shoulder $l$ is so placed on the bolt that it will abut against the arch of the U-bolt and prevent the sliding of the bolt $k$ unless the U-bolt is first forced outwardly. It will be seen, therefore, that when the U-bolt is in its normal position, it will be impossible to slide the bolt $k$ and consequently impossible to open the gate $b$. When, however, the cage reaches the landing, its projection $h$ will impinge against cam $g$ and thus force the U-bolt outwardly far enough to permit the shoulder $l$ to pass through the U-bolt and thereby permit the gate $b$ to be opened.

It will be observed that in those cases where another gate is employed at the opposite side of the shaft, the same locking device can be employed for that gate also, as indicated in the drawings, the opposite gate being shown at $b'$ and the duplicate bolt being shown at $k'$, this latter bolt working through the arch of the U-bolt alongside of the bolt $k$ and in the opposite direction.

Having thus described my invention, what I claim is:

1. In an apparatus of the class described, the combination of an elevator structure provided with a pair of swinging gates at opposite sides of the shaft, a cage working in the shaft, a pair of locking bolts arranged side by side and arranged to slide in opposite directions, means whereby the opening of the gates will cause the bolts to slide in opposite directions, a locking device acting normally to prevent both bolts sliding in the direction necessary to permit opening of the gates, and means whereby when the cage arrives at the landing both bolts will be automatically released and thus permit either or both gates to be opened, said locking device consisting of a U-member and a spring for causing it to normally move inwardly and a swinging lever mounted in the shaft and carrying said U-member at its free end.

2. In an apparatus of the class described, the combination of an elevator structure provided with a swinging gate, a cage working in the shaft, a horizontally sliding locking bolt and means whereby the opening of the gate will slide said bolt, a locking member for said bolt and means whereby it is normally forced inwardly to normally lock said bolt against sliding, a lever having affixed to its upper end said locking member and having its lower end pivoted in the shaft at a point below the landing, and means whereby when the cage arrives at the landing the upper end of the lever will be forced outwardly to thus unlock the bolt.

In testimony whereof I hereunto affix my signature in the presence of two witnesses.

WILLIAM G. JOHNSON.

Witnesses:
BENJ. A. CROWTHER,
J. R. EHRET.

Copies of this patent may be obtained for five cents each, by addressing the "Commissioner of Patents, Washington, D. C."